(12) United States Patent
Marioni

(10) Patent No.: US 6,217,452 B1
(45) Date of Patent: Apr. 17, 2001

(54) DIRECTION-DEPENDENT DRIVING COUPLING BETWEEN THE ROTOR OF A PERMANENT-MAGNET SYNCHRONOUS MOTOR AND THE WORKING PART

(75) Inventor: Elio Marioni, Dueville (IT)

(73) Assignee: Askoll Holding S.r.l., Dueville (IT)

( * ) Notice: Subject to any disclaimer, the term of this patent is extended or adjusted under 35 U.S.C. 154(b) by 0 days.

(21) Appl. No.: 09/380,568
(22) PCT Filed: Dec. 30, 1998
(86) PCT No.: PCT/EP98/08518
  § 371 Date: Sep. 7, 1999
  § 102(e) Date: Sep. 7, 1999
(87) PCT Pub. No.: WO99/35403
  PCT Pub. Date: Jul. 15, 1999

(30) Foreign Application Priority Data

Jan. 8, 1998 (IT) .................................. PD98A03

(51) Int. Cl.[7] ..................................... F16D 15/00
(52) U.S. Cl. ................. 464/74; 464/137; 403/1; 188/82.8; 192/45.1
(58) Field of Search .............................. 464/74, 160, 137, 464/73; 403/1; 192/45.1, 41 R; 188/82.8, 82.1

(56) References Cited

U.S. PATENT DOCUMENTS

| 770,641 | * | 9/1904 | Houghtaling | 192/45.1 |
| 1,968,771 | * | 7/1934 | Jex | 192/45.1 |
| 2,224,935 | * | 12/1940 | Schultz | 188/82.1 |
| 3,581,857 | * | 6/1971 | Dallman | 192/41 R |
| 4,803,855 | * | 2/1989 | Kennedy | 464/160 |
| 5,560,460 | * | 10/1996 | Ezawa | 192/46 |

FOREIGN PATENT DOCUMENTS

| 0 148 343 | 7/1985 | (EP) . |
| 0 207 430 | 1/1987 | (EP) . |

* cited by examiner

Primary Examiner—Lynne H. Browne
Assistant Examiner—Kenn Thompson
(74) Attorney, Agent, or Firm—Guido Modiano; Albert Josif; Daniel O'Byrne

(57) ABSTRACT

A direction-dependent driving coupling between the rotor of a permanent-magnet synchronous motor and a working part. The coupling comprises at least one first eccentric driving tooth and at least one cantilevered elastomeric element which are rigidly coupled to a first one of the two components between which motion is to be transmitted; the cantilevered element is arranged peripherally close to a cylindrical wall, of which it partially follows the shape, and the wall is formed by a housing, in which the rotor is arranged, and is motionless, at start-up, with respect to the motorized component. At least one second eccentric tooth is rigidly coupled to a second one of the two components between which motion is to be transmitted in such a position that the path between the parts causes it to interact with the first tooth in one direction and to interact with the cantilevered element in the opposite direction, producing a radial outward thrust which flexes the cantilevered element against the cylindrical wall, blocking it.

16 Claims, 6 Drawing Sheets

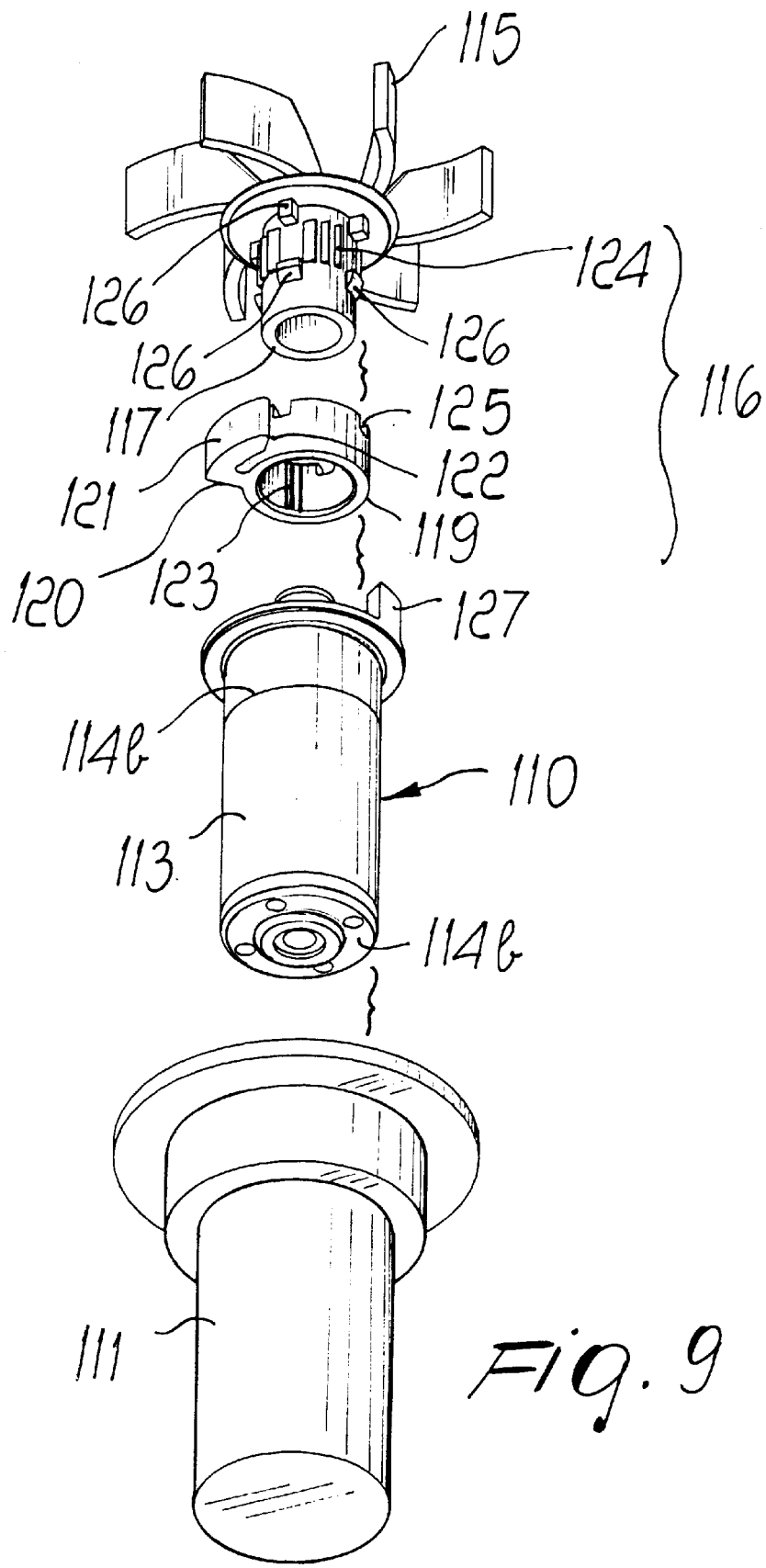

DIRECTION-DEPENDENT DRIVING COUPLING BETWEEN THE ROTOR OF A PERMANENT-MAGNET SYNCHRONOUS MOTOR AND THE WORKING PART

BACKGROUND OF THE INVENTION

The present invention relates to a direction-dependent driving coupling between the rotor of a permanent-magnet synchronous motor and the working part.

It is known that permanent-magnet synchronous motors are bidirectional, i.e., at power-on the rotor can be induced equally to rotate clockwise or counterclockwise.

This depends on the arrangement of the polarities of the rotor with respect to the magnetic field that forms between the poles of the stator pack when the inductor winding is supplied with alternating current.

Although this is not a problem in the case of the actuation of centrifugal pumps with radial vanes, it becomes a considerable limitation for centrifugal pumps and for fans having a particular configuration of the vanes and therefore a single direction of rotation of the impeller.

This is one of the main problems in the field of centrifugal machines which use permanent-magnet motors, and various electrical and mechanical devices have been proposed so far.

Among these, the motor pump unit described in EP 148343 is particularly significant.

This motor pump unit has a box-like body with a permanent-magnet synchronous electric motor, the rotor whereof is arranged within a substantially cup-shaped coaxial jacket arranged in the gap.

The rotor supports, at one end, an impeller whose hub lies coaxially inside the jacket.

An intermediate sleeve, driven by the rotor, is arranged between the impeller on one side and the corresponding final section of the rotor on the other side.

The intermediate sleeve comprises at least one cam which protrudes radially outwards; a tab co-operates with the cam on the internal surface of the hub and protrudes radially at the path of the cam.

The tab is part of a flexible braking flap formed in the hub.

When the cam of the intermediate element encounters the tab of the hub, the flap flexes and rests against the jacket that contains the rotor, blocking the rotation.

The hub is also provided with at least one tooth which protrudes radially inwards and with which the cam makes contact by rotating in the opposite direction with respect to the above cited one, making it rotate and rotating the impeller rigidly with the rotor.

This motor pump requires precise calibration in the regions of contact between the cam and the tab that is part of the flexible flap in order to avoid jamming.

The choice of the material that constitutes the flexible flap and the tab is in fact linked to the choice of the material of the impeller, with which it is monolithic since it is part of the hub.

The plastic material that constitutes the impeller, despite having a certain elasticity, must of course be predominantly rigid and accordingly the necessary elasticity of the flexible flap is the result of a compromise.

The fact of using mostly rigid plastic materials also has the inevitable consequence of increasing noise caused by impacts between the components at start-up.

Another device for producing direction-dependent rotations, which in this case is not linked to the problem of permanent-magnet electric motors, is known from GB 361656, in which a driving shaft supports two diametrically mutually opposite cams which are keyed to the shaft and which in one direction of rotation interfere with respective pawls pivoted in regions which are peripheral to the cams and support respective blocks arranged close to a cylindrical wall of a part to be driven.

The cams have a circular external surface, while the blocks have an eccentric circular internal surface which is arranged close to the surfaces of the cams.

Accordingly, rotary motion in one direction causes the cams to rigidly couple to the pawls, whereas by rotating in the opposite direction they produce a rotation of the blocks with respect to the respective fulcrums and lock them against the cylindrical wall.

In this case, although the flexible elements have been replaced with pivoted elements with respect to EP 148343, there is still an absolute need for perfect calibration of the geometry of the various parts, which must have a certain rigidity.

SUMMARY OF THE INVENTION

The aim of the present invention is to provide a direction-dependent driving coupling between the rotor of a permanent-magnet synchronous motor and the working part which eliminates the drawbacks noted above in conventional types.

Within the scope of this aim, a consequent primary object is to provide a direction-dependent driving coupling which is unaffected by any problem in choosing the materials related to the rotor and/or the working part.

Another important object is to provide a direction-dependent driving coupling which has an adequate response to the dynamics of start-up, so that start-up in the chosen direction is immediate.

Another important object is to provide a direction-dependent driving coupling in which start-up impact noise is reduced.

Another object is to provide a direction-dependent driving coupling which, by using the same components and acting only on the assembly process, allows to vary the direction of rotation at will.

Another object is to provide a direction-dependent driving coupling which has a particularly simple structure and assembly.

Another object is to provide a direction-dependent driving coupling which can be used both for working parts such as impellers of centrifugal pumps and for working parts such as the impeller of fans, i.e., with loads having considerably different inertias.

This aim, these objects and others which will become apparent hereafter are achieved by a direction-dependent driving coupling between the rotor of a permanent-magnet synchronous motor and a working part, characterized in that it comprises at least one first eccentric driving tooth and at least one cantilevered elastomeric element which are rigidly coupled to a first one of the rotor and the working part between which motion is to be transmitted, said cantilevered element being arranged peripherally close to a cylindrical wall, of which it partially follows the shape, said wall being formed by a housing in which the rotor is arranged and being motionless, at start-up, with respect to the motorized component, at least one second eccentric tooth being rigidly coupled to a second one of the rotor and the working part between which motion is to be transmitted in such a position that the path between the rotor and the working part causes it to interact with said first tooth in one direction and to interact with said cantilevered element in the opposite direction, producing a radial outward thrust which flexes said cantilevered element against said cylindrical wall, blocking all movement.

BRIEF DESCRIPTION OF THE DRAWINGS

Further characteristics and advantages of the invention will become apparent from the detailed description of two embodiments thereof, illustrated by way of nonlimitative example in the accompanying drawings, wherein:

FIG. 9 is an exploded view of the components of the assembly of FIG. 8;

DESCRIPTION OF THE PREFERRED EMBODIMENTS

Figure 2:
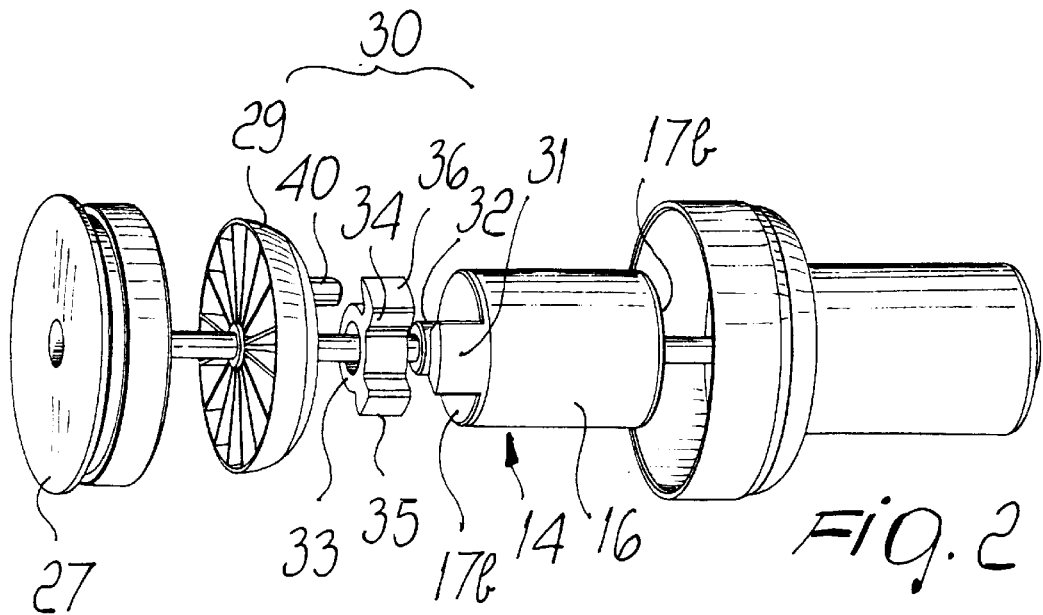
FIG. 2 is an exploded view of the assembly of the rotor and of the driving coupling related to FIG. 1.
Figure 1:
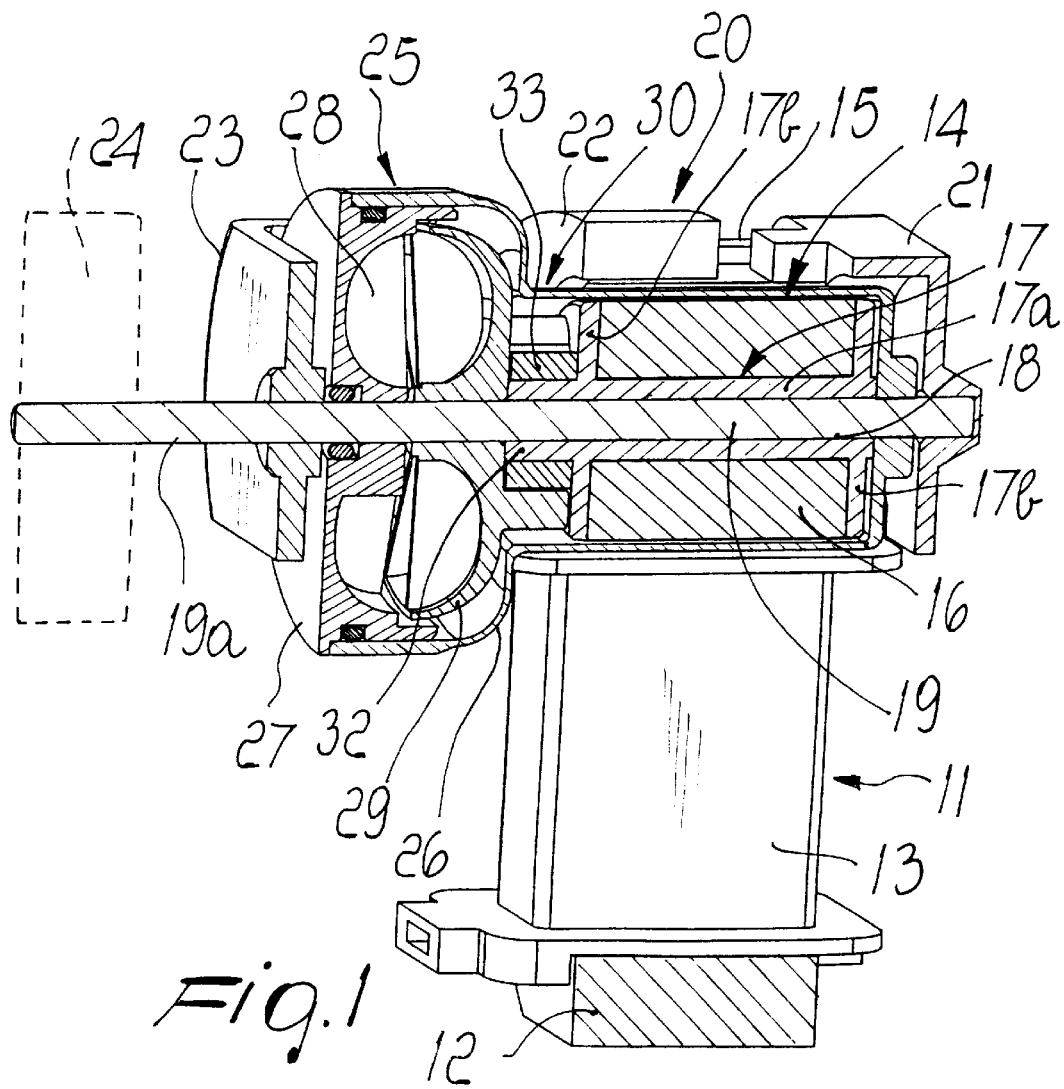
FIG. 1 is a sectional perspective view of a permanent-magnet electric motor, to the rotor of which a direction-dependent driving coupling according to the invention is coupled.
Figure 4:
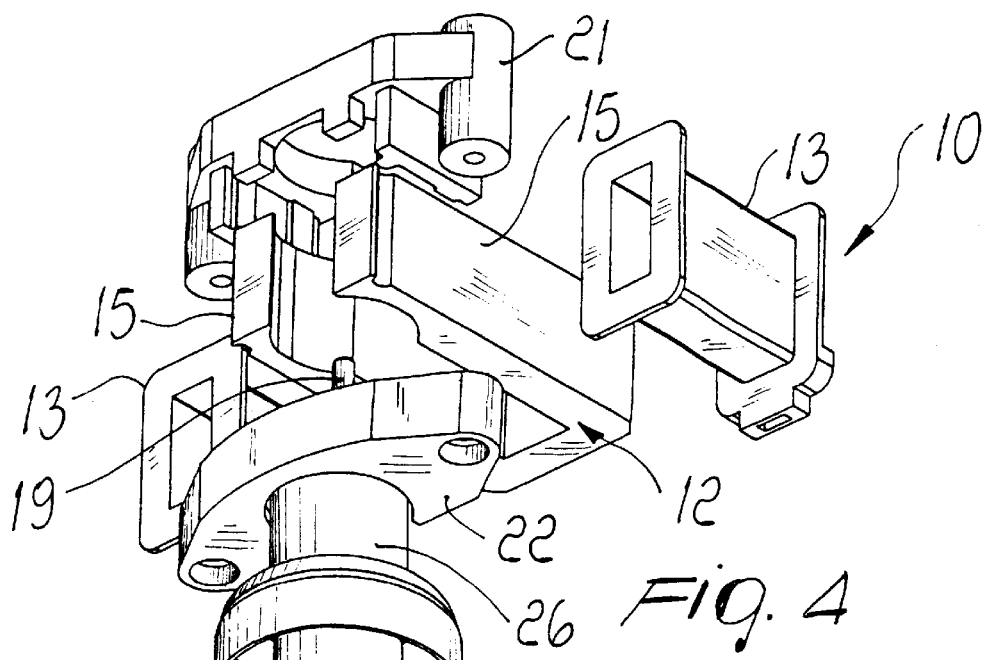
FIG. 4 is an exploded view of the entire motor of FIG. 1.
Figure 3:
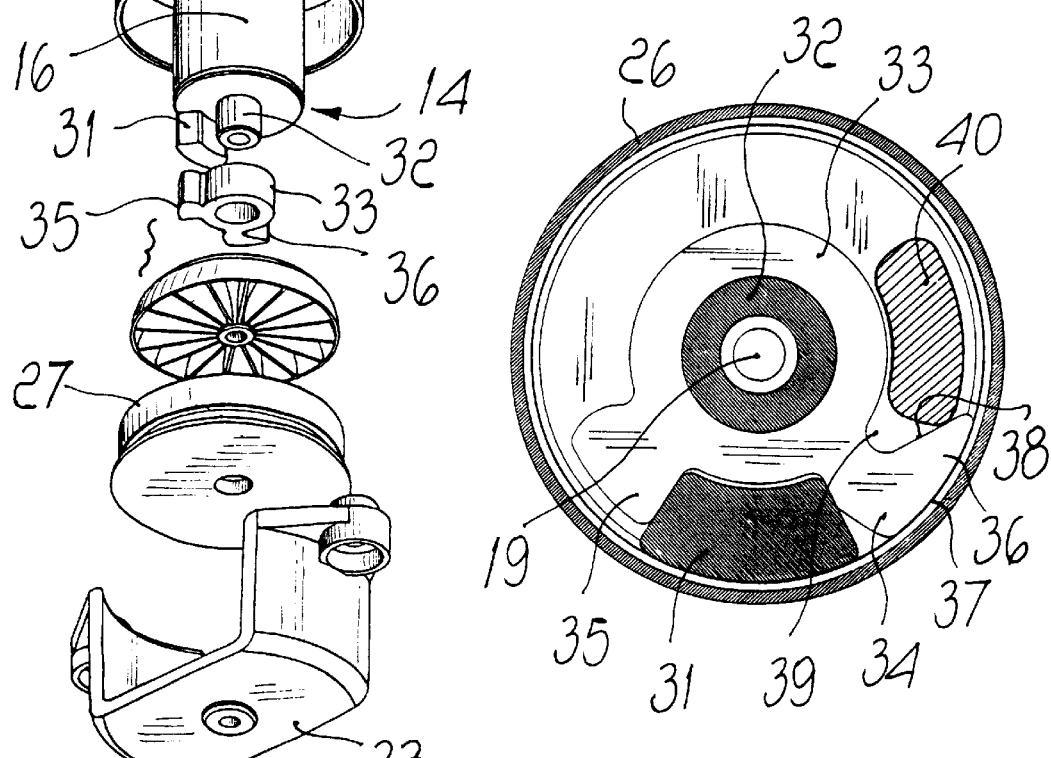
FIG. 3 is a transverse sectional view of the driving coupling.

With reference to FIGS. 1 to 4 described above, said figures illustrate a permanent-magnet electric motor, which is generally designated by the reference numeral 10 and is of a per se known type already described in Italian patent application No. PD97A000124 filed Jun. 12, 1997 in the name of the same Applicant.

In particular, the electric motor 10 comprises a stator 11, a lamination pack 12 with windings 13, and a rotor 14 which is arranged between two poles 15 formed by the lamination pack 12.

The rotor 14 is constituted by an annular cylindrical permanent magnet 16, on which a plastic element 17 is overmolded; the plastic element forms an internal tang 17a and end flanges 17b.

The rotor 14 therefore is, as a whole, cylindrical with an axial hole 18 in which a shaft 19 is inserted; the rotor 14 can rotate freely about the shaft 19.

The shaft 19 is in turn connected to a supporting structure, generally designated by the reference numeral 20, which in this case is composed of three complementary elements, designated by the reference numerals 21, 22 and 23 respectively, which are arranged coaxially and are joined by means of screws which are not illustrated.

The supporting structure encloses the assembly constituted by the poles 15, the rotor 14 and the shaft 19, allowing the shaft in any case to protrude with an end 19a to which a working part to be turned is rigidly coupled. The working part is shown in dashed lines and designated by the reference numeral 24, and can be constituted for example by an impeller of a fan.

The rotor 14 is arranged inside a hermetic housing, generally designated by the reference numeral 25, which is rigidly coupled to the shaft 19 and is composed of a cup-shaped element 26 and of a hermetic plug 27.

The plug is arranged in a diametrically wider portion of the cup-shaped element 26 and is provided with vanes 28 which act as a turbine for a liquid which is contained in the hermetic housing 25 in which the rotor 14 is arranged.

A bladed impeller 29, which in this case acts as a pump, faces the vanes 28 of the plug 27 in the wider part of the hermetic housing 25 and is coupled to the rotor 14 by means of a direction-dependent driving coupling according to the invention, which is generally designated by the reference numeral 30 in the figures.

The coupling 30 comprises at least one first driving tooth 31 and an internally hollow tang 32; both are monolithic with the corresponding flange 17b of the rotor 14 from which they protrude axially, and the tooth is eccentric (i.e., it is radially shifted with respect to the shaft 19 of the rotor 14).

An annular element 33 made of an elastomer such as rubber is arranged so as to surround the tang 32 and one of its peripheral portions is adjacent to a radially internal portion of the first tooth 31.

Two radial tabs, designated by the reference numerals 34 and 35, respectively protrude from the annular element 33 and are arranged at the ends of the first tooth 31.

At least one cantilevered element 36 protrudes from one of the radial tabs 34,35, in this case in particular the tab designated by the reference numeral 34, and is peripherally close to the cylindrical wall of the cup-shaped element 26, of which it partially follows the shape.

In particular, the profile of the cantilevered element 36 has a circular portion 37, which is indeed adjacent to the wall of the cup-shaped element 26, and a straight portion 38, which gives it a wedge-like shape.

The cantilevered element 36 forms, together with the annular element 33 with which it is monolithic, a hollow region 39 in which at least one second tooth 40 can partially enter. The second tooth 40 protrudes eccentrically with respect to the shaft 19 from the bladed impeller 29.

The relative path, in one direction of rotation, between the second tooth 40 and the cantilevered element 36 causes the cantilevered element to radially push it outwards, flexing it against the cylindrical wall of the cup-shaped element 26 and blocking its motion.

For rotations in the opposite direction, which are caused at start-up by the initial orientation of the magnetic field or by its reversal after an attempt in the opposite direction combined with the rebound effect produced by the elastomeric material, the second tooth 40 rests against the radial tab 35 and therefore interacts with the first tooth 31, making it rotate.

Accordingly, blocking occurs for attempted rotations in one direction, whereas freedom is allowed in the opposite direction.

Over a certain portion of a complete rotation, approximately 180x degrees, the rotor 14 is disengaged from the load constituted by the bladed impeller 29 and can therefore start freely before rotationally driving the impeller.

The impeller 29, together with the vanes 28, forms a viscous coupling in which the impeller provides kinetic energy to the working fluid contained in the housing 25 only in the direction in which the rotor 14 rotates.

The kinetic energy is converted into pressure energy (head) by the shape of the vanes of the meridian ducts of the impeller 29.

The working fluid moved in the vane ducts of the impeller 29 starts to circulate in the ducts of the vanes 28 of the plug 27, which accordingly start to rotate.

Thus, the working part 24 is made to rotate.

The viscous coupling, combined with the driving coupling 30, ensures the direction-dependent start-up of the motor in conditions which are fully similar to those of an asynchronous motor.

At this point it should be stressed, with reference to what has been provided so far by the state of the art, that the element that provides direction-dependent motion (the annular element 33 with radial tabs 34 and 35 and a cantilevered element 36) is an independent part which is not integrated with the other parts of the coupling.

A first effect of this is a simplification of the production mold, but in particular this allows to provide the element using the most adapted material in terms of mechanical characteristics and of impact cushioning in order to obtain low noise levels.

This independence makes the assembly less dependent on a correct calibration of the geometries, since it is simply necessary to obtain, upon contact between the parts, a component of radial force which causes the cantilevered element 36 to flex outwards.

The provision of the element that determines direction-dependent motion by using an elastomer such as rubber allows to utilize the high friction coefficient of the rubber to ensure initial quick and quiet blocking or allows to determine at will the degree of deformation of the cantilevered element 36 in a simple way by acting on the hardness of the material or on the geometry of the parts with no risk of jamming of the system, achieving adequate start-up responses.

It should also be noted that the radial tab 35, in the case of a correct direction of rotation at start-up, acts as a shock-absorber and therefore as a noise damping element.

It is furthermore particularly important that the annular element 33 can be fitted equally with the radial tabs 34 and 35 on either side of the first tooth 31; this allows to decide the direction of rotation simply by changing the orientation with which it is assembled.

The configuration of the load (for example the vane curvature of an impeller) must of course be adequate.

It should also be noted that the coupling has no articulated parts which may be easily subjected to jamming caused by the deposit of dirt.

Figure 5:
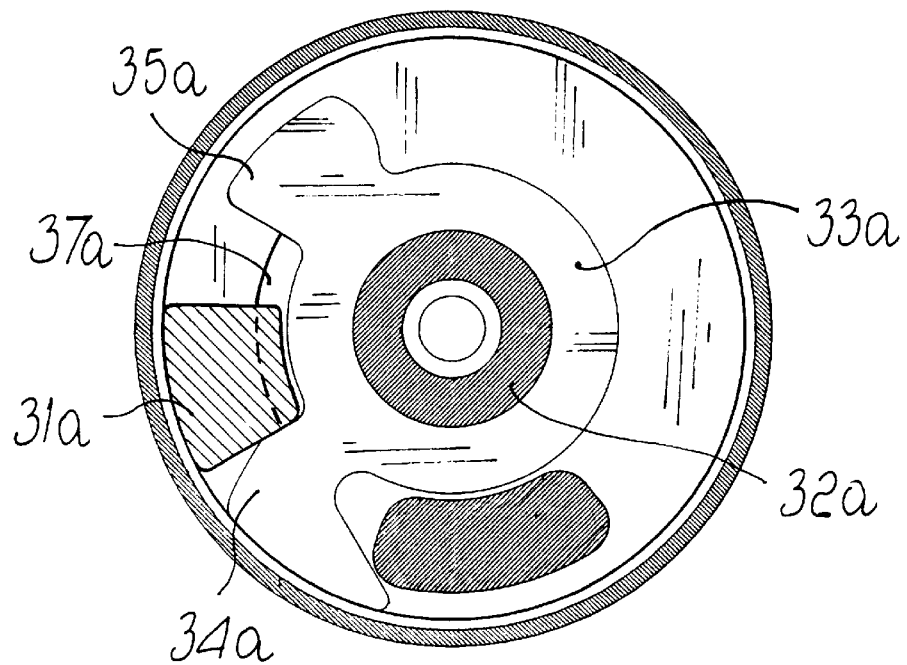
FIG. 5 is a transverse sectional view of another embodiment of the driving coupling.
Figure 6:
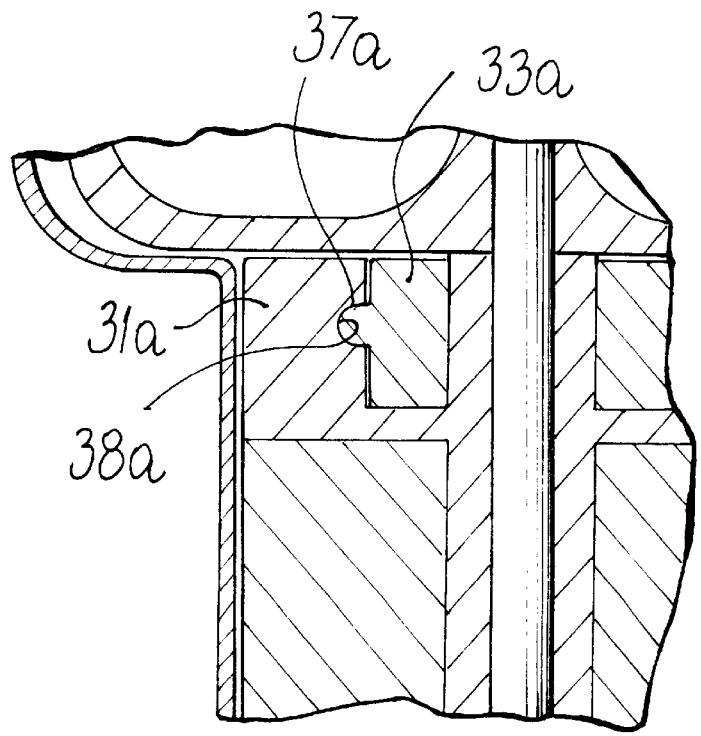
FIG. 6 is a longitudinal sectional view of the embodiment of FIG. 5.

With reference now to the above FIGS. 5 and 6, in a different embodiment of the coupling the first tooth, now designated by the reference numeral 31a, covers an angle which is smaller than the angular space between the radial tabs, now designated by the reference numerals 34a and 35a, of the annular element, which is now designated by the reference numeral 33a.

The annular element is provided, between the tabs 34a and 35a, with a tang 37a which has a semi-circular cross-section and is inserted in a complementarily shaped hollow 38a of the first tooth 31a, with which it makes contact.

At start-up, therefore, before the first tooth 31a makes contact with the tab 35a and before the consequent driving, there is a friction effect between the tang 37a and the hollow 38a in relative motion, consequently damping the contact impact.

Friction can of course also be provided by simply acting on the interference between the annular element 33a and the tang arranged inside it, which is now designated by the reference numeral 32a.

Figure 8:
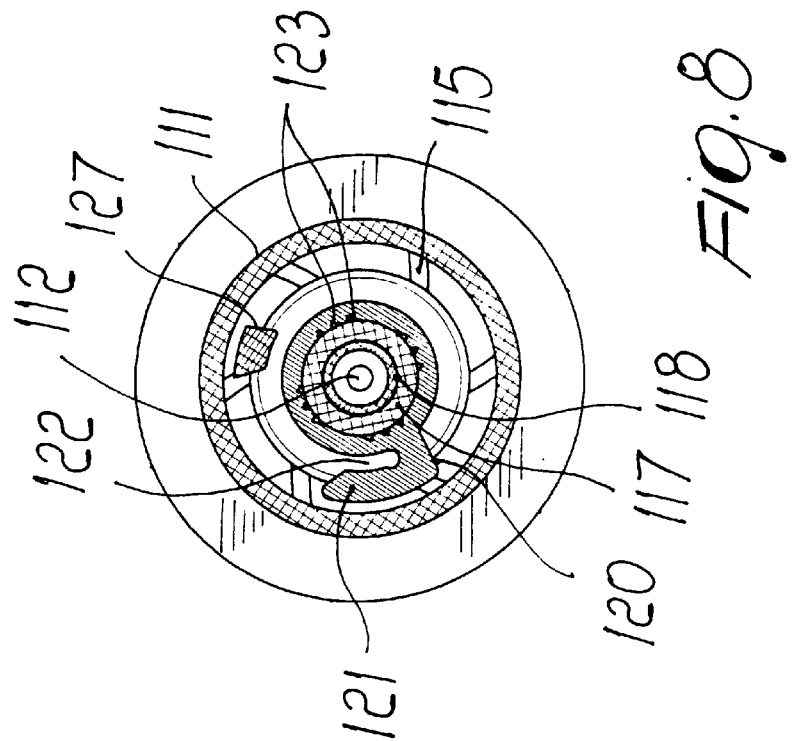
FIG. 8 is a sectional view of the rotor part alone, taken along the plane VIII—VIII of FIG. 7.
Figure 7:
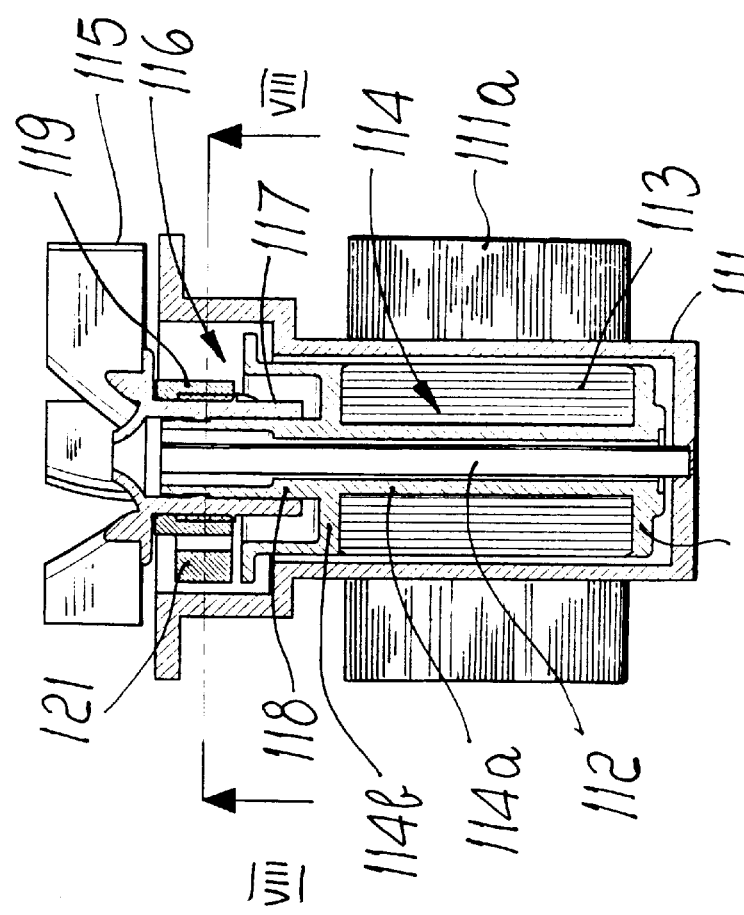
FIG. 7 is a longitudinal sectional view of a second permanent-magnet electric motor provided with a second embodiment of the driving coupling according to the invention.

With reference now to FIGS. 7 to 9 described above, a permanent-magnet electric motor of the previously described type which is connected to an impeller of a centrifugal pump is illustrated.

In particular, a permanent-magnet rotor 110 is arranged inside a tube-shaped chamber 111 (housing) which is arranged in the gap between two poles formed with a lamination pack 111a which are connected to windings (not shown), and can rotate freely with respect to a shaft 112 which is fixed axially to the chamber.

The rotor 110 is composed of an annular permanent magnet 113 and of an overmolded element 114 made of plastics, which forms an internal tang 114a and end flanges 114b.

A direction-dependent driving coupling according to the invention, generally designated by the reference numeral 116 in a second embodiment, is arranged between the rotor 110 and the bladed impeller 115 which constitutes the working part.

In particular, the impeller 115, which has a hub 117 fitted on an extension 118 of the internal tang 114a of the rotor 110, with respect to which it is in any case able to rotate freely, supports an annular element 119 which is rigidly coupled to the hub 117 and is of the same type as the preceding element 33. A first tooth 120 protrudes radially from the annular element 119 and in turn is rigidly (monolithically) provided with a cantilevered element 121, i.e., with an element which is peripherally close to the cylindrical wall of the tube-shaped chamber 111, of which it partially follows the shape and which has a substantially wedge-shaped free end.

A hollow region 122 is formed between the cantilevered element 121 and the annular elastomeric element 119.

As regards again the annular element 119, it is provided with grooves 123 which are complementary to grooves 124 of the hub 117 in order to rigidly rotationally couple it to the hub.

The annular element 119 also is provided with axial hollows 125 which constitute seats for positioning raised portions 126 of the hub 117 in order to correctly position it and fix it axially.

The driving coupling 116 also comprises a second tooth 127 which protrudes from a corresponding flange 114b of the overmolded element 114 of the rotor 110 and is arranged so that its path, in one direction, causes it to make contact with the first tooth 120, rotating it. In the opposite direction, the path of the second tooth causes it to make contact with the cantilevered element 121, partially entering the hollow region 122, causing a radial outward thrust which flexes it against the cylindrical wall of the chamber 111, blocking it.

It should be noted in this case that the cantilevered element 121 is rigidly coupled to the working part, differently from the preceding case, in which it was rigidly coupled to the rotor.

In practice, this second embodiment also has shown the same advantages mentioned earlier for the first embodiment, except for the fact that in this case it is not possible to change, during assembly, the direction of rotation owing to the particular configuration of the coupling.

Figure 10:
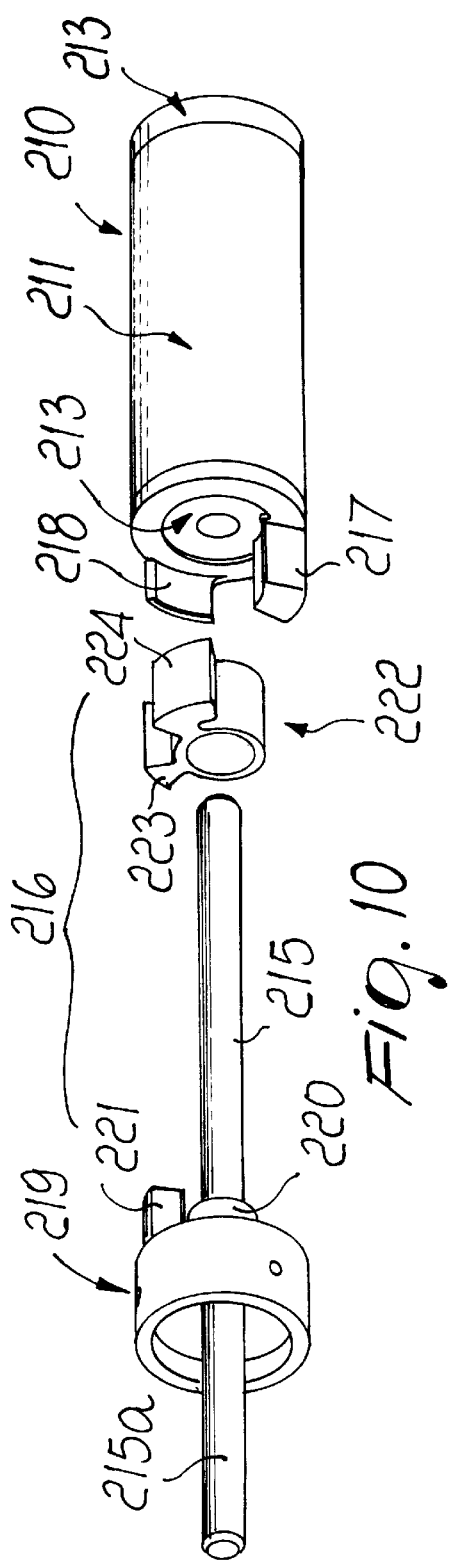
FIG. 10 is an exploded view of the assembly of the rotor and of a third embodiment of the driving coupling according to the invention.
Figure 11:
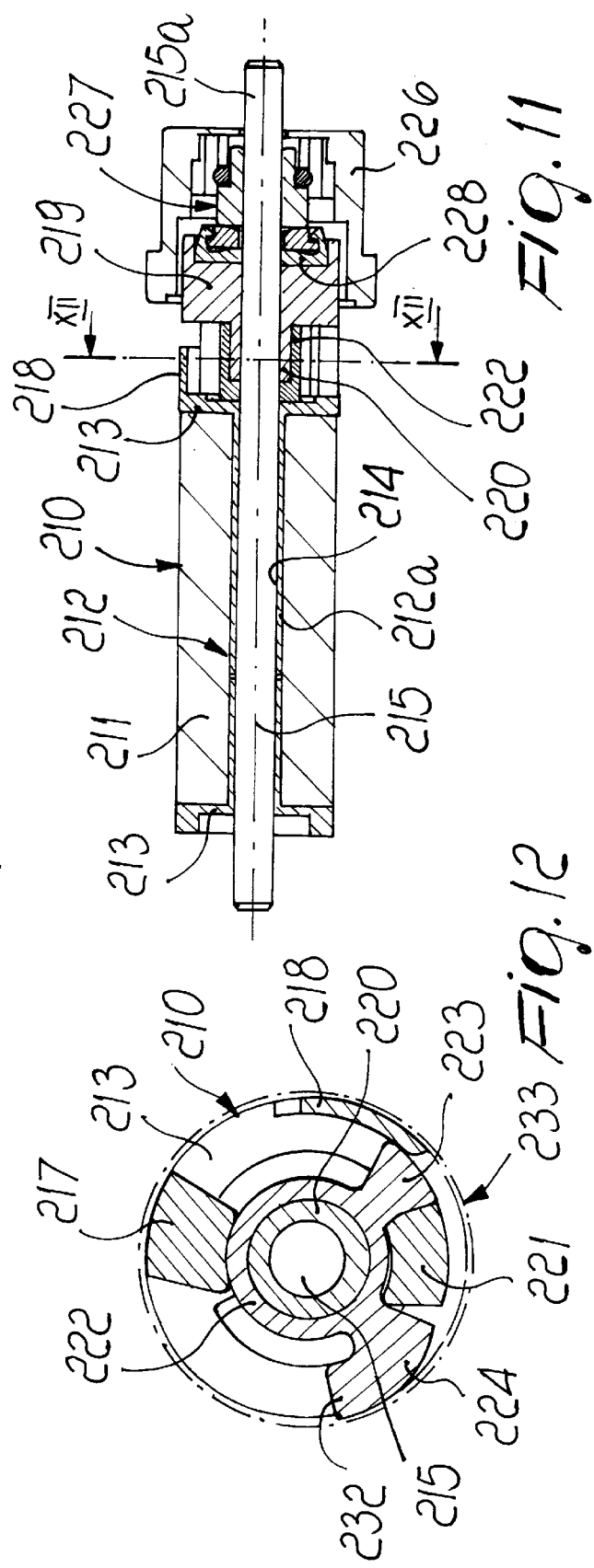
FIG. 11 is a sectional view, taken along a longitudinal plane, of the rotor and of the coupling of FIG. 10.
Figure 12:
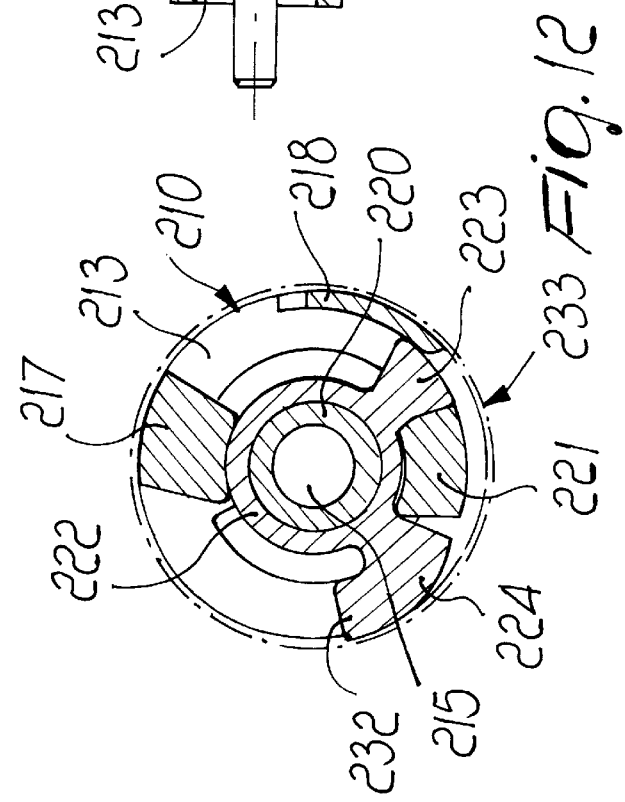
FIG. 12 is a sectional view, taken along the transverse plane XII—XII of FIG. 11.

With reference to FIGS. 10, 11 and 12, a rotor 210 is composed of a permanent magnet 211 which has a cylindrical annular structure and on which a plastic element 212 is overmolded which forms an internal tang 212a and, at the ends, flanges 213.

Accordingly, as a whole the rotor 210 has a cylindrical structure with an axial hole 214 in which a shaft 215 is inserted; the rotor 210 can rotate freely with respect to the shaft 215.

The shaft 215 has a free end 215a which protrudes from the rotor 210 and with which a working part is rigidly associated, as will become apparent hereinafter.

A direction-dependent driving coupling, in this case in a third embodiment designated by the reference numeral 216 in the above figures, is interposed between the rotor 210 and the working part.

The coupling 216 comprises a first driving tooth 217 which protrudes monolithically with respect to the flange 213 of the rotor 210 parallel to the shaft 215 in a radial eccentric position, i.e., shifted with respect to said shaft 215.

A curved flap 218 protrudes monolithically from the flange 213 from a position which is rotated substantially through a right angle with respect to the first tooth 217; the flap is parallel to the shaft 215 and acts as an extension of the external structure of the rotor 210.

A body 219 is overmolded on the shaft 215 proximate to the free end 215a, has a cylindrical structure and is axially crossed by the shaft 215.

The body 219 has, on the side directed toward the rotor 210, an annular extension 220 which lies axially and has a smaller diameter and is also crossed with a rigid coupling by a corresponding portion of the shaft 215.

A second tooth 221 protrudes from the body 219, is parallel to the annular extension 220 and is arranged eccentrically in a radial position, i.e., shifted with respect to the shaft 215 of the rotor 220.

In particular, the external path covered by the second tooth 221 due to the rotation of the shaft 215 and of the body 219 that is rigidly coupled thereto does not interfere with the curved flap 218 which is rigidly coupled to the rotor 210.

The driving coupling 216 comprises an annular element 222 made of an elastomer such as rubber which surrounds, on assembly, the extension 220 and has in particular a first radial tab 223 and a second radial tab 224 which are arranged at the ends of the second tooth 221.

A cantilevered element 232, in particular, protrudes from the second radial tab 224 and is peripherally close to the cylindrical wall, schematically designated by the reference numeral 233, of a housing of the rotor 210.

In this manner, while the bulk occupied externally by the first radial tab 223 does not interfere with the curved flap 218, which is substantially the extension of the external structure of the rotor 210 and does not interfere with the cylindrical wall of the housing, schematically shown by the dashed line 233, the overall shape of the second tab 224, produced by said cantilevered element 232, widens starting from the region proximate to the second tooth 221 until it interferes with the wall 233 of the housing.

The free end 215a of the shaft 215 which is rigidly coupled to the working part, constituted for example by the bladed impeller of a fan not shown in the figures for the sake of simplicity, is supported by a cup-shaped element 226 on the bottom of which there is a hole which is crossed by the free end 215a.

A thrust bearing 227, which absorbs the axial vibrations, and a sliding bearing, designated by the reference numeral 228 and of a per se known type, are arranged inside the cup-shaped supporting element 226.

When the rotor 210 starts, the first driving tooth 217 and the curved flap 218 are turned, together with the flange 213 which is rigidly coupled to the rotor 210, in a direction which depends on the initial orientation of the magnetic field.

If the direction of rotation is such as to bring the first driving tooth 217 to rest against the first radial tab 223, it also directly actuates the second tooth 221, which is in fact locked between the first radial tab 223 and the second radial tab 224, consequently rotating the body 219 as well and accordingly rotating the shaft 215 on which the working part is keyed.

The curved flap 218 in fact is wedged, just before contact between the first tooth 217 and the first tab 223, between the second radial tab 224 and the cylindrical wall 223 of the housing, moving the cantilevered element 232 away from it so as to prevent contacts and consequent friction.

Vice versa, if the direction of rotation of the first tooth 217 is such as to make it rest against the second radial tab 224, the tab is consequently subjected to an outward thrust which widens the cantilevered element 232 against the cylindrical wall 233 of the housing, producing considerable friction between the moving parts owing to the high friction coefficient of the annular element 222, which is made of elastomer.

It is interesting to note that by virtue of the structure of the coupling 216, if the direction of rotation is not the intended one, the result is a quick and most of all silent speed reduction and blocking action.

It is also interesting to note that when the first radial tab 223, pushed by the first tooth 217, rotates the second tooth 221 concordantly with it, it performs a shock-absorbing function, cushioning any impact and consequent noise.

In practice it has been observed that the intended aim and objects of the present invention have been achieved.

The invention thus conceived is susceptible of numerous modifications and variations, all of which are within the scope of the inventive concept.

All the details may furthermore be replaced with other technically equivalent elements.

In practice, the materials used, so long as they are compatible with the contingent use, as well as the dimensions, may be any according to the requirements.

The disclosures in Italian Patent Application No. PD98A000003 from which this application claims priority are incorporated herein by reference.

What is claimed is:

1. A direction-dependent driving coupling between the rotor of a permanent-magnet synchronous motor and a working part, comprising at least one first eccentric driving tooth and at least one cantilevered elastomeric element which are rigidly coupled to a first one of the rotor and the working part between which motion is to be transmitted, said cantilevered element being arranged peripherally close to a cylindrical wall, of which it partially follows the shape, said wall being formed by a housing in which the rotor is arranged and being motionless, at start-up, with respect to the motorized component, at least one second eccentric tooth being rigidly coupled to a second one of the rotor and the working part between which motion is to be transmitted in such a position that the path between the rotor and the working part causes it to interact with said first tooth in one direction and to interact with said cantilevered element in the opposite direction, producing a radial outward thrust which flexes said cantilevered element against said cylindrical wall, blocking it.

2. The coupling according to claim 1, wherein said cantilevered element protrudes from an annular element which is rigidly coupled to said first tooth.

3. The coupling according to claim 2, wherein said annular element is arranged radially internally with respect to said first tooth and has two tabs arranged at its ends, said cantilevered element protruding monolithically from one of said tabs.

4. The coupling according to claim 1, wherein said cantilevered element is radially interposed, with one of its portions, between said second tooth and said wall.

5. The coupling according to claim 1, wherein said first tooth is rigidly coupled to the rotor of the motor and wherein said cantilevered element is rigidly coupled to said first tooth, said cylindrical wall being rigidly coupled to the working part.

6. The coupling according to claim 5, wherein said second tooth is monolithically coupled to a bladed impeller which acts as a pump and faces a bladed impeller which acts as a turbine and is rigidly coupled to said wall since it is part, together with said wall, of a rotatable hermetic housing in which said rotor is arranged.

7. The coupling according to claim 1, wherein said cantilevered element is monolithic with said first tooth.

8. The coupling according to claim 7, wherein said first tooth is rigidly coupled to said working part and said second tooth is rigidly coupled to said rotor.

9. The coupling according to claim 8, wherein said working part has a hub which rigidly supports an annular elastomeric element from which said first tooth protrudes radially, said annular element supporting said cantilevered element which is rigidly coupled thereto and lies peripherally close to the cylindrical wall of a tube-shaped chamber in which said rotor is placed and which is part of the supporting structure of said rotor.

10. The coupling according to claim 9, wherein said second tooth is monolithic with said rotor.

11. The coupling according to claim 9, wherein said annular element is internally provided with grooves which are shaped complementarily to grooves of said hub which are adapted to rigidly couple it to said hub in rotation, said annular element being also provided with axial hollows which constitutes seats for positioning raised portions of said hub for correctly positioning and axially fixing it.

12. The coupling according to claim 1, wherein at least its free end is substantially wedge-shaped.

13. The coupling according to claim 1, wherein between said annular elastomeric element and the one of said two components that can be in relative motion therewith at start-up, on the side that corresponds to the correct direction of rotation there are parts which are in sliding contact over a preset angle so as to provide a friction effect in order to cushion the start-up impact.

14. The coupling according to claim 13, wherein the angle covered by said first tooth is smaller than the angular space between said tabs that protrude from said annular element, so as to provide a friction-controlled relative motion at start-up.

15. The coupling according to claim 1, wherein said first tooth is rigidly coupled to the rotor of the motor and said second tooth is rigidly coupled to said working part, a curved flap protruding from said rotor from a position which is rotated with respect to said first tooth, to which it is rigidly coupled, said flap extending the external structure of the rotor and wedging itself, when said first tooth actuates said second tooth rigidly coupled to the working part, between said cantilevered element and said cylindrical wall so as to prevent all contact, said cylindrical wall being fixed with respect to said motorized component.

16. The coupling according to claim 6, wherein said housing in which the rotor is arranged is fixed with respect to the stator.

\* \* \* \* \*